United States Patent [19]

D'Luhy

[11] 3,965,786

[45] June 29, 1976

[54] ROTARY DIE CUTTER

[75] Inventor: Emil D'Luhy, Youngstown, N.Y.

[73] Assignee: Moore Business Forms, Inc., Niagara Falls, N.Y.

[22] Filed: July 16, 1974

[21] Appl. No.: 489,045

[52] U.S. Cl. .................................... 83/346; 83/659; 83/12

[51] Int. Cl.$^2$ .......................................... B23D 25/12

[58] Field of Search ................... 83/9, 55, 481, 482, 83/659, 663, 669, 684, 685, 346, 12, 527, 8; 93/58.1, 58.2, 59

[56] References Cited

UNITED STATES PATENTS

| | | | |
|---|---|---|---|
| 1,935,522 | 11/1933 | Prior | 83/12 |
| 3,272,046 | 9/1966 | Crouch et al. | 83/346 X |
| 3,274,873 | 9/1966 | Sauer | 83/659 X |
| 3,566,734 | 3/1971 | Robinson | 83/346 X |
| 3,832,926 | 9/1974 | Leaseburge et al. | 83/346 X |
| 3,850,059 | 1/1973 | Kang | 83/346 X |

*Primary Examiner*—Willie G. Abercrombie

*Attorney, Agent, or Firm*—Watson, Cole, Grindle & Watson

[57] ABSTRACT

A rotary die cutter comprises a pair of plate and anvil cylinders rotatable about fixed and spaced axes for die cutting a web passing therebetween. A die cutting plate is secured along the periphery of the plate cylinder, and an anvil plate is secured along the periphery of the anvil cylinder. The clearance between plate and anvil cylinders is determined by the thickness of the anvil plate thereby providing an interference between plates for a clear-through die cut or a gap for die cutting less than each layer of a multi-layered material depending on the thickness of the anvil plate selected.

6 Claims, 5 Drawing Figures

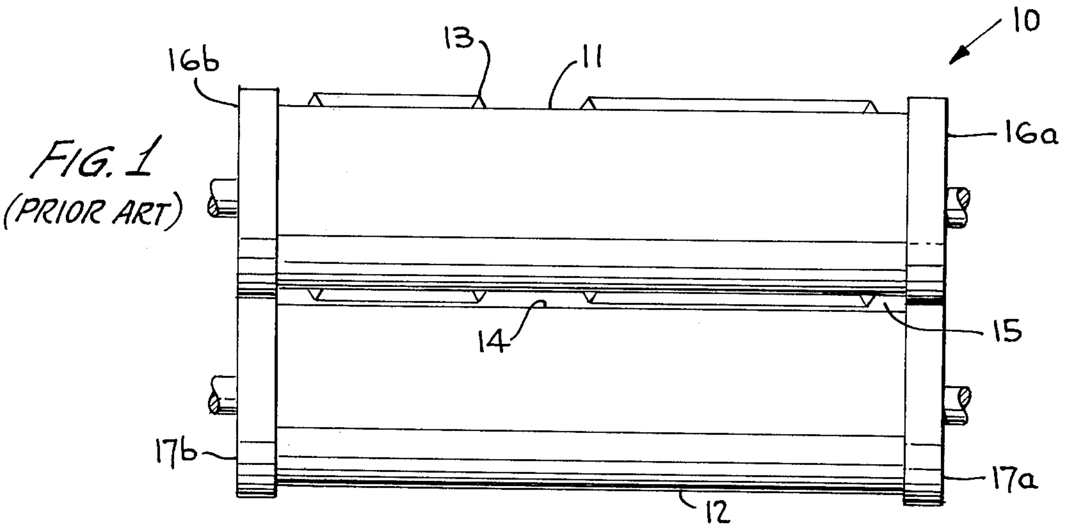
FIG. 1
(PRIOR ART)
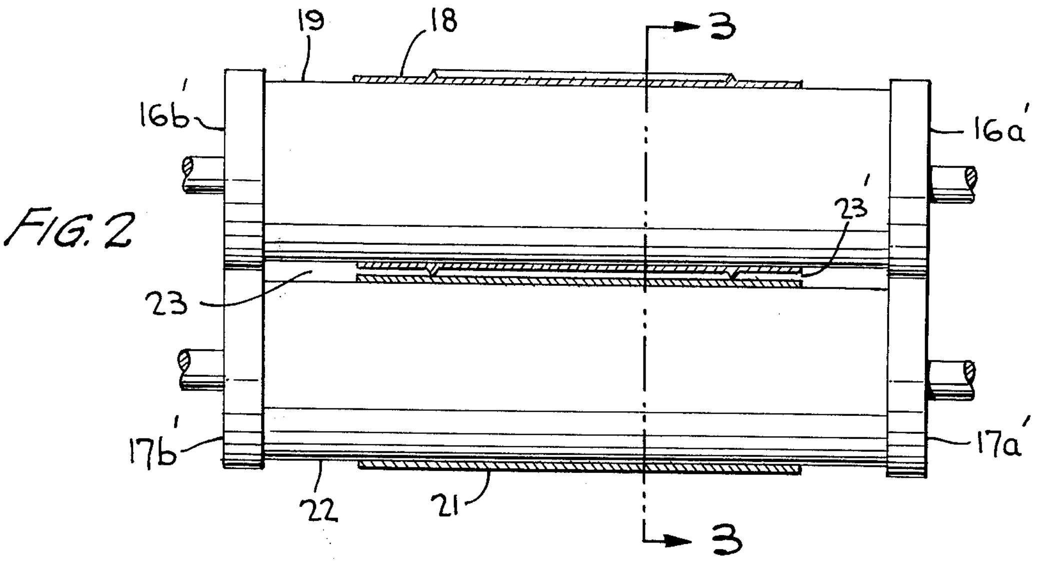
FIG. 2
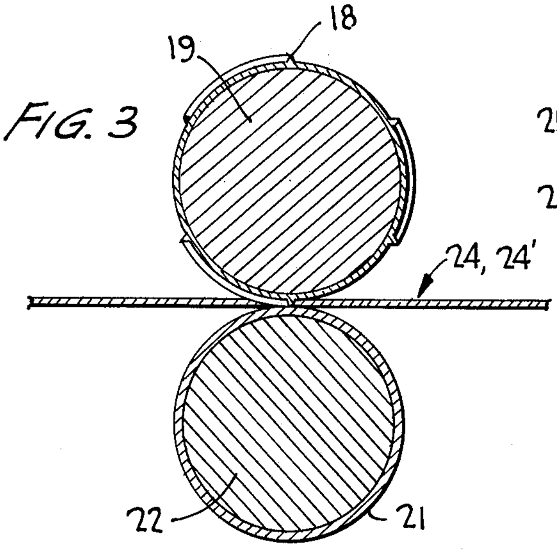
FIG. 3
FIG. 4
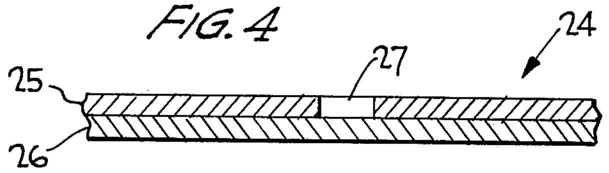
FIG. 5
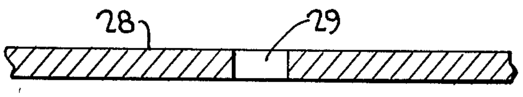

ROTARY DIE CUTTER

This invention relates generally to a rotary die cutting device, and more particularly to such a device wherein a removable anvil plate determines the gap between anvil and plate cylinders for effecting a selected die cut on a web.

Any number of approaches have been heretofore used in the rotary cutting of a moving web of paper and the like. Such have included a punch and die, cutting rule dies cutting against steel or other materials, etc. Such die cutting operations are, however, costly, and the preparation time for the web and the limitations on the particular cut permitted reduce the effectiveness of such operations. Also, in the rotary die cutting of a moving web, it oftentimes becomes necessary to cut multi-layered web material wherein only the upper layer or layers of the material are to be cut without disturbing the bottom layer. As an example, pressure sensitive material is die cut into labels as the tacky material overlying its backing moves between a pair of die cut plate and anvil cylinders. To avoid cutting through the backing layer, cylindrical bearers are secured to both the die and anvil cylinders and, being of a diameter sufficiently larger than their respective cylinders, a fixed clearance is established between the die and the anvil. When cutting completely through a web, die and anvil cylinders of a certain diameter and/or bearers of a certain diameter must be selected. On the other hand, when die cutting only through the upper layer or layers of a multi-layered material such as a sensitive label stock, die and anvil cylinder diameters and/or bearer diameters of different sizes must be used. Therefore, it becomes impractical to change over from a clear-through die cutting operation to a pressure-label die cutting operation because of the high cost of change-over from one type of die cutting to the other.

While die cutting a multi-layered web such as a pressure sensitive label material, the die cutting surface of the die cylinder must be out of contact with the surface of the anvil cylinder, the clearance between cylinders being such that the die cutting surface cuts through the upper layer or layers but not through the lower or backing layer of the multi-layered web material. Therefore, the clearance between plate and anvil must change if the caliper of the lower layer of the multi-layered web is changed. And, because of normal mechanical tolerances such as plate caliper, bearer outer diameter, cylinder outer diameter, etc., it becomes necessary at times to have the cutting surface and the anvil cylinder surface completely in contact with or in interference with one another to insure a proper cutting.

A rotary die cutting apparatus is therefore provided by the present invention in which an anvil plate of a predetermined thickness is secured along the periphery of the anvil cylinder so as to provide either a clearance or an interference with the die cutting surface of die cylinder depending on whether a clear-through die cut or an upper layer-only die cut of the web is to be made. A change in the diameter of the anvil cylinder is thereby effected without the need for replacing either cylinders or their bearers for a particular die cutting operation.

Another object of this invention is to provide such an apparatus wherein the anvil cylinder is of a magnetized material and the anvil plate is of a ferromagnetic material so that it can be secured magnetically to its anvil cylinder.

A further object of the invention is to provide such an apparatus wherein both cylinders are magnetized material and the die cutting surface on the die cylinder is defined by a die cutting plate magnetically secured thereto.

Other objects, advantages and novel features of the invention will become more apparent from the following detailed description of the invention when taken in conjunction with the accompanying drawings wherein:

FIG. 1 is a side elevational view of cooperating anvil and plate cylinders of a rotary die cutting apparatus in accordance with the prior art;

FIG. 2 is a side elevational view similar to FIG. 1 except that the removable die cutting plate and anvil plate are shown mounted in place as in accordance with the present invention;

FIG. 3 is a cross-sectional view of the cylinders and their plates with the web shown disposed therebetween, as taken along line 3—3 of FIG. 2; and FIGS. 4 and 5 are sectional views of portions of a multi-layered and a single web, respectively, shown with an upper layer die cut as in FIG. 4 and with a clear-through die cut as in FIG. 5.

Turning now to the drawings wherein like reference characters refer to like and corresponding parts throughout the several views, a die cutting apparatus 10 is shown in FIG. 1 in accordance with the prior art as including a die or plate cylinder 11 and an anvil cylinder 12 each mounted for rotation in any normal manner about their respective longitudinal axes and cooperating with one another for the die cutting of a web passing therebetween. The plate cylinder has a die cutting surface 13 thereon either spaced from or in interference with the anvil surface 14, clearance 15 therebetween being established in part by the diameter size of the cylinders. Normally, cylindrical bearer plates 16*a* and 16*b* are provided at opposite ends of plate cylinder 11, and similar bearer plates 17*a* and 17*b* are provided at opposite ends of anvil cylinder 12. Adjacent bearer plates between cylinders are in contact with one another along their peripheral surfaces, and bearer plates of different diameters further determine the size of clearance 15 between the cylinders. As pointed out hereinabove, any change of cylinder and/or bearer plate sizes for increasing or decreasing the depth of clearance 15 between cylinders to provide for a through-cut or a partial cut of the web passing therebetween, is not only time-consuming but costly because of the apparatus downtime considerations as well as because of the need for stocking a wide variety of cylinders and bearer plates of different sizes. Moreover, the cylinders must be slightly shifted toward and away from one another when bearer plates of different diameters are used. Therefore, the cylinder mountings, which must be designed to permit such shifting, require time to adjust and are otherwise expensive.

The present invention avoids these drawbacks by providing a die cut plate 18 removably secured along the periphery of plate cylinder 19 shown in FIG. 2 as having a smooth surface to accommodate its plate 18. Also, an anvil plate 21 is removably secured to the periphery of an anvil cylinder 22. Each of these cylinders is mounted between support plates 20*a*, 20*b* for rotation about their respective longitudinal axes, which are fixed relative to one another and spaced apart to provide a clearance 23 between plates 18 and 21. The bearer plates may therefore be eliminated since the depth of clearance 23 between cylinders is established by the thickness of anvil plate 21. Both cylinders 19 and 22 are of magnetized material and their plates 18 and 21 are of a ferromagnetic material so that they may be respectively secured magnetically to their cylinders. This facilitates easy installation and removal of these plates, especially the anvil plate which may need to be replaced during excessive wear when providing an interference fit with die cut plate 18 during a clear-through web cutting operation.

When die cutting a multi-layered web 24 which includes an upper layer 25 having a backing or lower layer 26 as shown in FIG. 4, the web of course passes between the cylinders as illustrated in FIG. 3 (the web being omitted from FIG. 2 for clarity). In order to die cut an opening such as 27 in only upper layer 25 of the web, an anvil plate 21 is selected as having such a thickness as to maintain a clearance 23 between it and die cut plate 18 which will permit die cuts only in layer 25. On the other hand, when it is desired to die cut a through opening such as 29 in a single web 28 shown in FIG. 5, an increased thickness of an anvil plate 21 is selected so as to provide a zero clearance between plates. Actually, such a plate thickness is selected so as to provide an interference between the anvil plate and the die cut plate. Clear-through openings such as 29 may therefore be provided for single layer 28 and, if desired, for any number of layers of a web because of the interference fit between plates 18 and 21.

The modifications of the rotary die cutting apparatus provided by the present invention, as described above, permit the die cut plate 18 to be easily changed depending on the particular die cutting operation without the need for also changing plate cylinder 19. Anvil plate 21 may be discarded and replaced when it becomes worn during especially the through-cutting operations without the need for also replacing the anvil cylinder. And clearance 23 between plates may be simply altered, depending on the type of die cutting operation, by using an anvil plate of the necessary thickness to effect the proper clearance for clear-through or partial die cuts of the moving web. Again, anvil cylinder 22 need not be replaced for this purpose, nor is it necessary to use bearer plates as in the manner heretofore required. The changeover operation to accommodate clear-through and partial die cuts of a moving web is therefore made easy and economical yet highly effective by the present invention.

Obviously, many modifications and variations of the invention are possible in the light of the above teachings. It is therefore to be understood that within the scope of the appended claims the invention may be practiced otherwise than as specifically described.

What is claimed is:

1. A rotary die cutting apparatus, comprising a rotatably mounted plate cylinder having die cutting means thereon, said die cutting means comprising a die cutting pattern including cutting edges lying both parallel and transverse to the longitudinal axis of said plate cylinder, a rotatably mounted cooperating anvil cylinder spaced from said plate cylinder, contacting bearer plates on said cylinders for maintaining said cylinders a fixed distance apart during rotation of said cylinders about their respective longitudinal axes, an anvil plate of substantially uniform thickness removably secured along the periphery of said anvil cylinder and disposed adjacent said pattern, the clearance between said anvil plate and said die cutting means being determined by the thickness of said anvil plate, whereby an interference fit as well as a gap may be provided as said clearance depending on the thickness of said anvil plate for respectively effecting a clear-through die cut and a partial die cut of at least one web arranged for movement between said cylinders, and whereby any contact between said die cutting means and said anvil cylinder is avoided by means of said anvil plate.

2. The rotary die cutter according to claim 1, wherein said anvil cylinder is of magnetized material, said anvil plate being of ferromagnetic material and thereby being secured magnetically to said anvil cylinder.

3. The rotary die cutter according to claim 1, wherein said die cutting surface is defined by a die cutting plate removably secured to said plate cylinder.

4. The rotary die cutter according to claim 3, wherein said plate cylinder is of magnetized material, said die cutting plate being of ferromagnetic material and thereby being secured magnetically to said plate cylinder.

5. The rotary die cutter according to claim 2, wherein said die cutting surface is defined by a die cutting plate removably secured to said plate cylinder.

6. The rotary die cutter according to claim 5, wherein said plate cylinder is of magnetized material, said die cutting plate being of ferromagnetic material and thereby being secured magnetically to said plate cylinder.

* * * * *